US008566799B2

(12) United States Patent
Bates

(10) Patent No.: US 8,566,799 B2
(45) Date of Patent: Oct. 22, 2013

(54) RESUMING A PRIOR DEBUG SESSION

(75) Inventor: Cary L. Bates, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 153 days.

(21) Appl. No.: 13/183,716

(22) Filed: Jul. 15, 2011

(65) Prior Publication Data

US 2013/0019228 A1    Jan. 17, 2013

(51) Int. Cl.
G06F 9/44 (2006.01)
(52) U.S. Cl.
USPC .......................................... 717/129; 717/124
(58) Field of Classification Search
None
See application file for complete search history.

(56) References Cited

U.S. PATENT DOCUMENTS

| | | | | |
|---|---|---|---|---|
| 5,446,900 | A * | 8/1995 | Kimelman | 717/124 |
| 6,981,243 | B1 * | 12/2005 | Browning et al. | 717/124 |
| 7,634,687 | B2 | 12/2009 | Haselden et al. | |
| 7,849,446 | B2 | 12/2010 | Lev et al. | |
| 2003/0084430 | A1 * | 5/2003 | Bates et al. | 717/131 |
| 2003/0101437 | A1 * | 5/2003 | Gritter | 717/129 |
| 2003/0208746 | A1 * | 11/2003 | Bates et al. | 717/129 |
| 2005/0010912 | A1 * | 1/2005 | Adolphson et al. | 717/151 |
| 2007/0150871 | A1 * | 6/2007 | Barsness et al. | 717/128 |
| 2007/0300209 | A1 * | 12/2007 | Bates et al. | 717/129 |
| 2009/0313610 | A1 * | 12/2009 | Vaidyanathan et al. | 717/129 |
| 2012/0185829 | A1 * | 7/2012 | Yaffe | 717/125 |
| 2012/0297173 | A1 * | 11/2012 | Tudor et al. | 712/227 |

* cited by examiner

Primary Examiner — Chat Do
Assistant Examiner — Chau Nguyen
(74) Attorney, Agent, or Firm — Biggers & Ohanian, LLP

(57) ABSTRACT

Inserting, at debuggee source code lines, a breakpoint and executing. For each breakpoint encounter until exiting: encountering and removing the breakpoint, incrementing a first counter value, and resuming execution. Exiting includes saving the first counter value, a state of the call stack, and an exit location. In a second debug session, preparing the debuggee to resume from the exit location. Inserting, at the debuggee source code lines, a breakpoint and executing the debuggee. For each breakpoint encounter until a second counter value matches the first: encountering and removing the breakpoint, incrementing the second counter value, and resuming execution. When the first and second counter values match: inserting an exit location breakpoint at the exit location, executing the debuggee until encountering the exit location breakpoint, and providing the user control to resume debugging from the exit location only if the present state of the call stack matches the saved state.

13 Claims, 6 Drawing Sheets

RESUMING A PRIOR DEBUG SESSION

BACKGROUND OF THE INVENTION

1. Field of the Invention

The field of the invention is data processing, or, more specifically, methods, apparatus, and products for resuming a prior debug session.

2. Description of Related Art

Software debugging may be a time consuming task. In fact, rarely is software debugging successfully completed in a single debug session. A user—a software developer, for example—may begin debugging one day, but be unable to complete the debugging that same day. Resuming debugging from a stopping point of a previous debug session enables a software developer to reduce duplicative debugging, increase efficiency of software development, lower software development costs, and so on. Prior art methods of resuming from a previous debug session's stopping point, however, are extremely time consuming, inefficient, resource intensive tasks.

SUMMARY OF THE INVENTION

Methods, apparatus, and products for resuming a prior debug session are disclosed in this specification. Some embodiments of resuming a prior debug session described in this specification include loading a debuggee in a first debug session. Loading the debuggee in the first session includes: inserting, at one or more lines of debuggee source code, a coverage breakpoint and executing the debuggee at the behest of a user. For each coverage breakpoint encounter until exiting the first debug session: encountering a coverage breakpoint thereby stopping execution, removing the coverage breakpoint, incrementing a first counter value, and resuming execution without user interaction. Exiting the first debug session includes saving the first counter value, a state of the debuggee's call stack, and an exit location.

Upon reloading the debuggee in a second, subsequent debug session, embodiments of the present invention include preparing the debuggee to resume debugging from the exit location. Such preparation includes: inserting, at the one or more lines of debuggee source code, a coverage breakpoint and executing the debuggee. For each coverage breakpoint encounter until a second counter value matches the first counter value: executing the debuggee, encountering a coverage breakpoint thereby stopping execution, removing the coverage breakpoint, incrementing the second counter value, and resuming execution without user interaction. When the first and second counter values match embodiments of the present invention include inserting an exit location breakpoint at the exit location, executing the debuggee until encountering the exit location breakpoint thereby stopping execution at the exit location, and providing the user control to resume debugging from the exit location only if the present state of the call stack matches the saved state of the call stack state.

Other embodiments of resuming a prior debug session described in this specification include loading a debuggee in a first debug session. In these embodiments, loading a debuggee includes inserting, at an entry point of each routine of the debuggee, an entry breakpoint and executing the debuggee at the behest of a user. For each entry breakpoint encounter until exiting the first debug session, embodiments include encountering an entry breakpoint thereby stopping execution, incrementing a counter value associated with the routine, and resuming execution without user interaction. Exiting the first debug session includes saving an exit location, the counter value associated with a routine that includes the exit location, and a state of the debuggee's call stack.

Upon reloading the debuggee in a second, subsequent debug session, embodiments of the present invention include preparing the debuggee to resume debugging from the exit location. Such preparation includes: inserting, at the entry point of the routine that includes the exit location, an entry breakpoint and executing the debuggee. For each encounter of the entry breakpoint until a present counter value matches the saved counter value, embodiments include encountering the entry breakpoint thereby stopping execution, incrementing the present counter value, and resuming execution without user interaction. When the present counter value matches the saved counter value, embodiments include inserting an exit location breakpoint at the exit location, executing the debuggee until encountering the exit location breakpoint thereby stopping execution at the exit location, and providing the user control to resume debugging from the exit location only if the present state of the call stack matches the saved state of the call stack state.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
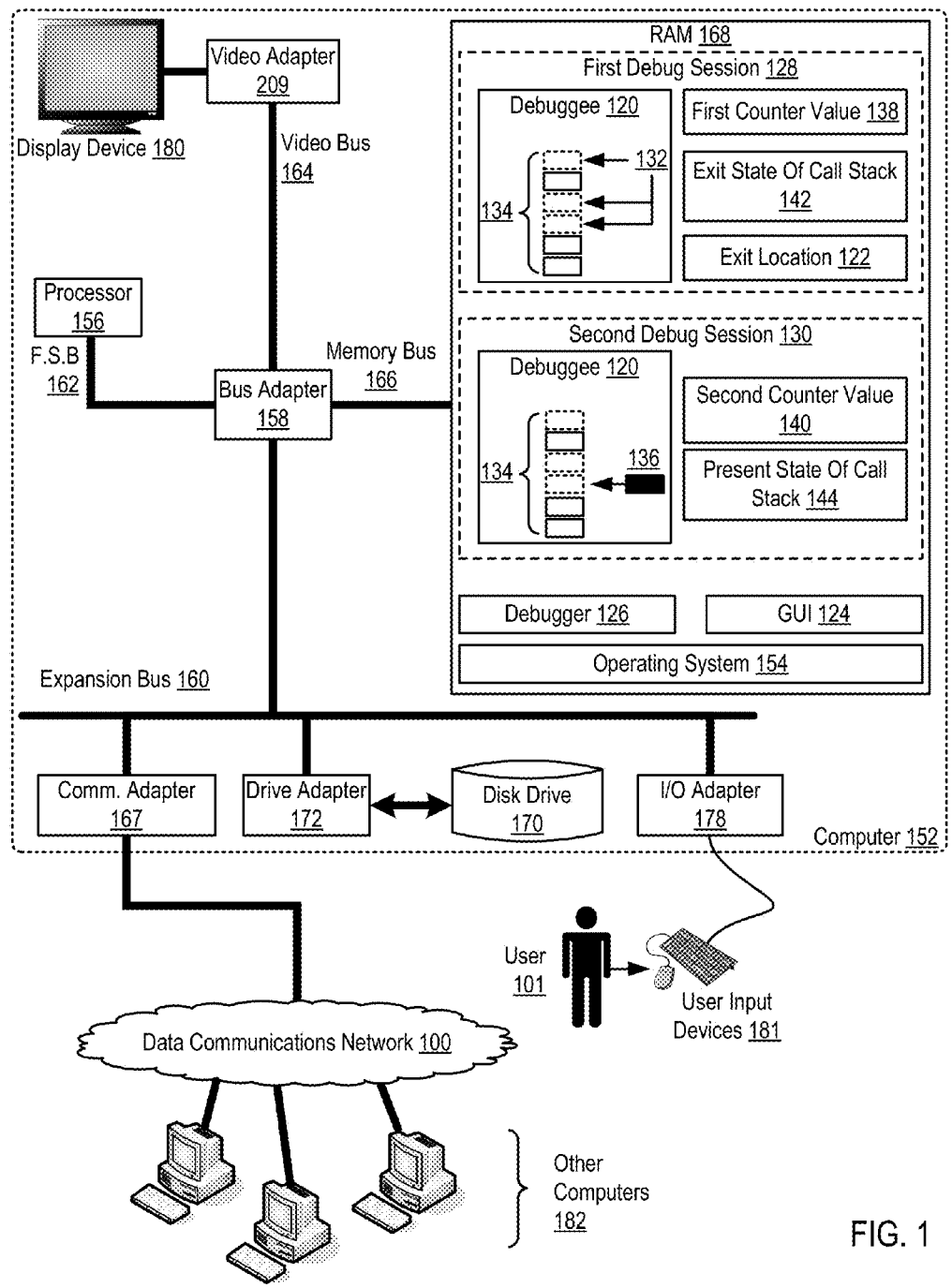
FIG. 1 sets forth a block diagram of automated computing machinery forming a system that supports resuming a prior debug session according to embodiments of the present invention.

Exemplary methods, apparatus, and products for resuming a prior debug session in accordance with the present invention are described with reference to the accompanying drawings, beginning with FIG. 1. FIG. 1 sets forth a block diagram of automated computing machinery forming a system that supports resuming a prior debug session according to embodiments of the present invention. The system of FIG. 1 includes an exemplary computer (152) that, in turn, includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a debugger (126). A debugger (126) is an application that controls operation of another application—a debuggee (120)—for the purpose of testing execution of the debuggee. The source code of the debuggee may run on an instruction set simulator (ISS), a technique that allows great power in its ability to halt when specific conditions are encountered but which will typically be somewhat slower than executing the code directly on a processor for which the code is written. When execution of a program crashes or reaches a preset condition, a debugger typically displays the position in the source code at which the execution of the program crashed. A 'crash' occurs when the program cannot normally continue because of a programming bug. In addition to displaying a position in source code when execution of the source code crashes, debuggers also often offer other functions such as running a program step by step (single-stepping or program animation), stopping, breaking, or pausing the program to examine the current state, at some event or specified instruction by means of a breakpoint, and tracking the values of some variables.

In the example system of FIG. 1, the debugger (126) presents a graphical user interface (124) as a front-end of the debugger (126). Front-ends are extensions to debugger engines that provide Integrated Development Environment ('IDE') integration, program animation, and visualization features, rather than console-based command line interfaces. The 'front-end' directly faces a client—or user (101)—in contrast to the debugger (126) in the example of FIG. 1, which interfaces indirectly with the clients through the GUI (124).

The example debugger (126) of FIG. 1 is configured to support resuming a prior debug session in accordance with embodiment of the present invention. A debug session as the term is used in this specification refers to finite time of software debugging by a debugger at the behest of a user and the resources required to effect such debugging. Such a finite time may commence at the loading of the debuggee source files and terminate at the exit of debuggee execution.

The debugger (126) in the example system of FIG. 1 may be configured to load a debuggee (120) in a first debug session (128). In the example of FIG. 1, loading the debuggee (120) in the first debug session (128) includes inserting, at one or more lines of debuggee source code, a coverage breakpoint (134). A coverage breakpoint is a breakpoint, inserted by a debugger, to track execution of source code lines. As explained below in more detail, a user (101) need not be aware of the existence of a coverage breakpoint and an coverage breakpoint is removed upon encounter during execution.

The example debugger (126) of FIG. 1 may insert a coverage breakpoint (134) at one or more lines of debuggee (120) source code in various ways. The debugger may, for example, insert a coverage breakpoint (134) at every line of the source code. The debugger may also, as another example, insert a coverage breakpoint at every line of source code except lines within a routine, where each routine has an entry point. When a coverage breakpoint (134) is encountered at an entry point of a routine, coverage breakpoints may then be inserted at source code lines within the routine. In this way, the initial insertion of coverage breakpoints requires less overhead and reduces the possibility of wasting effort to insert a coverage breakpoint within a routine that may never be executed.

After inserting the coverage breakpoints (134), the debugger (126) may execute, at the behest of a user (101), the debuggee. Executing the debuggee "at the behest of the user" refers to normal debugging from the perspective of the user. That is, the user controls the debugger to execute the debuggee. In executing the debuggee, however, coverage breakpoints may be encountered, momentarily stopping execution of the debuggee (120). For each coverage breakpoint (134) encounter until exiting the first debug session (128): encountering a coverage breakpoint (134) thereby stopping execution, removing (132) the coverage breakpoint, incrementing a first counter value (138), and resuming execution without user (101) interaction.

The removed coverage breakpoints (132) in the example debuggee (120) of the first debug session (128) are depicted here with dashed lines. Coverage breakpoints (134) remaining in the debuggee (120)—that is, not encountered during debuggee execution—are depicted with solid lines.

At any point during debugging, a user may request an exit of the debug session. Such requests may be initiated through the GUI (124) or by a direct debug command through a command line interface. Exiting the first debug session (128) in the example of FIG. 1 includes saving the first counter value (138), a state (142) of the debuggee's call stack, and an exit location (122). The saved first counter value (138) represents the number of coverage breakpoints encountered during execution of the debugee (120). The state of the call stack may include a complete copy of the current call stack at exit, or some information describing the call stack at exit—routines represented in the call stack, variables of the routines represented in the call stack, callback addresses, and so on as will occur to readers of skill in the art. An exit location as the term is used in this specification is a point of execution of the debuggee at which exiting began. An exit location may for example identify a line of source code last executed just prior to initiating an exit of the debug session.

The information saved at exit during the first debug session describes the state of execution of the debuggee immediately prior to beginning the exit. This information may be used by the debugger in a later debug session to aid in resuming debugging of the first debug session from the point at which the user exited debugging (the exit location).

Upon reloading the debuggee (120) in a second, subsequent debug session (130), the debugger (126) may be configured to prepare the debuggee (120) to resume debugging from the exit location. Such preparation includes: inserting, at one or more lines of the debuggee's source code, a coverage breakpoint (134). The lines at which the debugger (126) inserts the coverage breakpoints in the second debug sessions are the same lines as those in which the debugger (126) inserted coverage breakpoints in the first debug session (128). The debugger then executes the debuggee and, for each coverage breakpoint (134) encounter until a second counter value (140) matches the first counter value (138): encountering a coverage breakpoint (134) thereby stopping execution, removing the coverage breakpoint, incrementing the second counter value (140), and resuming execution without user interaction. When the first (138) and second (140) counter values match the debugger (126) may insert an exit location breakpoint (136) at the exit location. An exit location breakpoint (136) is a breakpoint inserted at the exit location. This type of breakpoint differs from a coverage breakpoint in that once encountered, the exit location breakpoint is not immediately removed and execution resumed without user interaction. Instead, execution is stopped and as described below control is passed over to the debugger if debuggee execution in the second debug session (130) matches debuggee execution in the first (128).

The debugger, after inserting the breakpoint and without user interaction—meaning automatically without requiring any action from the user—executes the debuggee (120) until encountering the exit location breakpoint (136) thereby stopping execution at the exit location. Once stopped, the debugger (126) determines whether the present state (144) of the call stack (the state of the call stack in the second debug session (130)) matches the saved state (142) of the call stack. If the call stacks match, the probability that the debuggee (120) in the second debug session (130) has taken the same, or nearly the same, execution path as the debuggee in the first debug session (130) is relatively high. As such the debugger (126) may provide the user (101) control to resume debugging from the exit location (122).

Although matching call stacks indicates a high probability that the first and second execution of the debuggee (120) also match up to the exit location, accuracy insuring that the two executions match may be increased in a variety of ways. One way, for example, includes saving, during the first debug session (128), exit values of one or more user-selected expressions. The user, on exiting the first debug session (128), may select one or more expressions or variables having present values (values at exit) to be saved during the exit. During the second debug session, when determining whether the call stacks match, the debugger (126) may also determine whether the present values of the user-selected expressions match the saved values. If both the first and second call stacks match and the first and second values of the user-selected expressions match, then the debugger (126) provides the user control to resume debugging from the exit location (122) in the second debug session (130).

Also stored in RAM (168) is an operating system (154). Examples of operating systems that support resuming a prior debug session according to embodiments of the present invention include UNIX™, Linux™, Microsoft XP™, AIX™, IBM's i5/OS™, and others as will occur to those of skill in the art. The operating system (154), debugger (126), compiler (122), GUI (124), and debuggee (120) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that support resuming a prior debug session according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers that support resuming a prior debug session according to embodiments of the present invention include modems for wired dial-up communications, Ethernet (IEEE 802.3) adapters for wired data communications network communications, and 802.11 adapters for wireless data communications network communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

FIG. 1 sets forth a system that supports resuming a prior debug session according to embodiments of the present invention through use of coverage breakpoints. Other types of breakpoints may also be useful in embodiments of resuming prior debug sessions. For further explanation, therefore, FIG. 2 sets forth a block diagram of automated computing machinery forming another example system that supports resuming a prior debug session according to embodiments of the present invention. The system of FIG. 2 includes an exemplary computer (152) that is similar to the computer depicted of FIG. 1, including many of the same computer components, designated in FIG. 2 with the same reference numbers as in FIG. 1.

Figure 2:
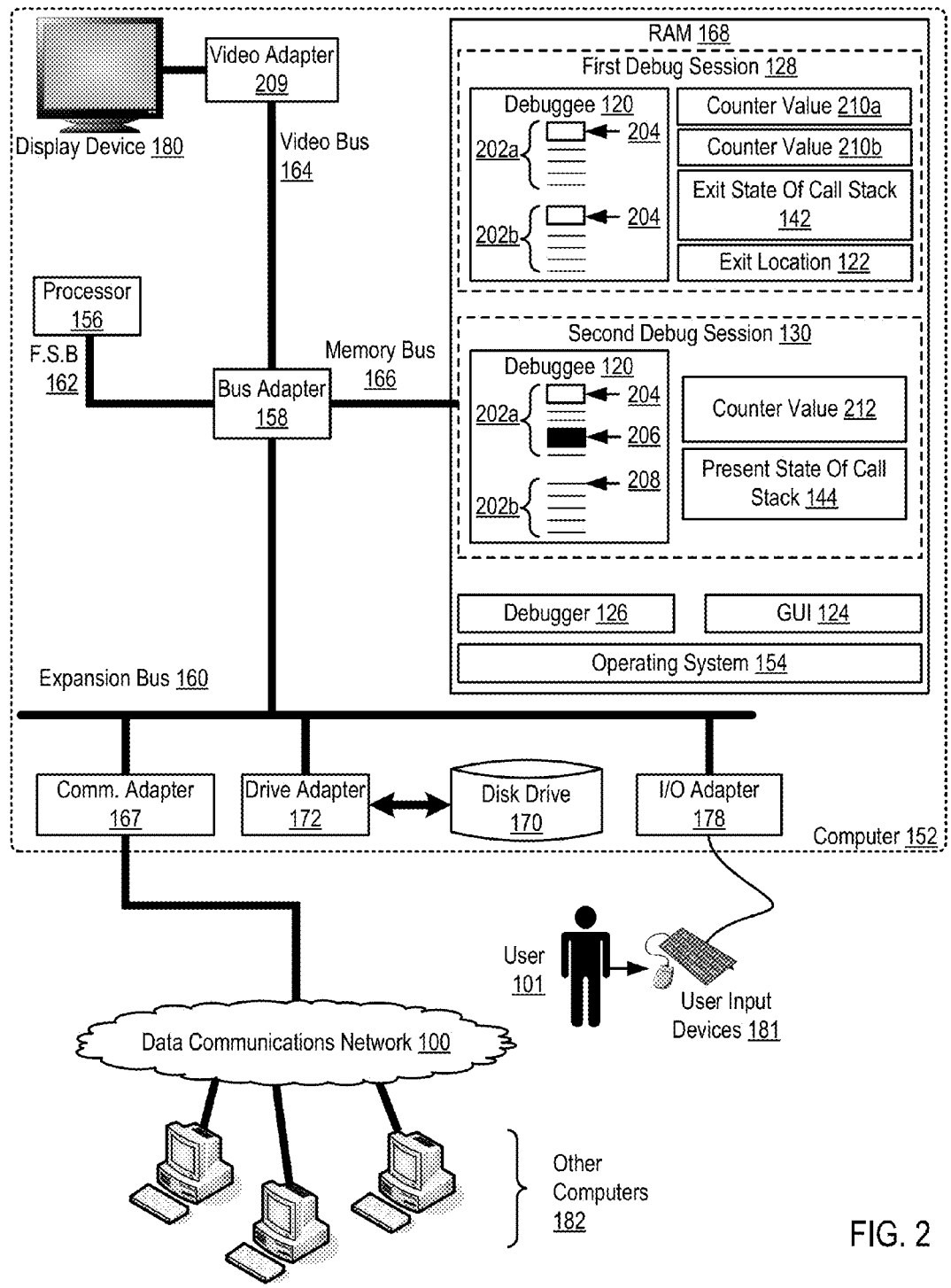
FIG. 2 sets forth a block diagram of automated computing machinery forming another example system that supports resuming a prior debug session according to embodiments of the present invention.

Stored in RAM (168) of FIG. 2 is a debugger (126). The debugger (126) in the example of FIG. 2 is configured to support resuming prior debug sessions in accordance with embodiments of the present invention by loading a debuggee (120) in a first debug session (128). During the load, the debugger (126) inserts, at an entry point of each routine (202a, 202b) of the debuggee (120), an entry breakpoint (204). An entry point of a routine may be a call to that routine, such as 'Goto' or foo( ) In other embodiments, an entry point may be a first line of a routine—use of pointers, for example, may make it unclear at the callsite of a routine which routine is actually being called. An entry breakpoint is a breakpoint inserted at an entry point of a routine. The user (101) need not be aware of the insertion of an entry breakpoint, nor its encounter as described below. In FIG. 2, only entry breakpoints are inserted by the debugger, rather than coverage breakpoints as in FIG. 1. In many cases, inserting entry breakpoints without coverage breakpoints may result in inserting fewer breakpoints in total, decreasing load time and load processing of the debuggee.

Once loaded, the debugger (126) executes the debuggee (120) at the behest of a user and, for each entry breakpoint (204) encounter until exiting the first debug session (128): the debuggee (120) encounters an entry breakpoint (204) thereby stopping execution, incrementing a counter value (210a, 210b) associated with the routine (202a, 202b), and resuming execution without user interaction. In the example of FIG. 2, the debugger (126) maintains a counter for each routine and increments that routine's counter upon an encounter of that routine's entry breakpoint. The user (101) may be completely unaware of each breakpoint encounter, execution stop, counter value incrementing, and execution resumption.

At any time during debugging the user (101) may request to exit the first debug session (128). Exiting the first debug session (128) in the example of FIG. 2 includes saving an exit location (122), the counter value (210a, 210b) associated with a routine that includes the exit location, and a state (142) of the debuggee's call stack. Rather than storing all counter values, the debugger (126) need only store the value of the routine in which the exit location exists—the last point of execution in the debuggee (120).

Upon reloading the debuggee (120) in a second, subsequent debug session, the debugger (126) is configured to prepare the debuggee (120) to resume debugging from the exit location (122), by: inserting, at the entry point of the routine (202a) that includes the exit location (122), an entry breakpoint (204). That is, rather than inserting an entry breakpoint at the entry point of each routine in the debuggee, the debugger (126) inserts only entry breakpoint—at the entry point of the routine that includes the exit location from the first debug session. Then the debugger (126) executes the debuggee (120) and, for each encounter of the entry breakpoint (204) until a present counter value (212) matches the saved counter value (210a): the debuggee (120) encounters the entry breakpoint (204) thereby stopping execution, the debugger (126) increments the present counter value (212), and resumes execution without user interaction. When the present counter value matches the saved counter value the debugger (126) inserts an exit location breakpoint (206) at the exit location (122), executes the debuggee (120) until encountering the exit location breakpoint (206) thereby stopping execution at the exit location (122) and determines whether the present state of the call stack (144) matches the saved state of the call stack (122). If the two call stack states match, the debugger (126) provides the user (101) control to resume debugging from the exit location (122).

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 2.

Figure 3:
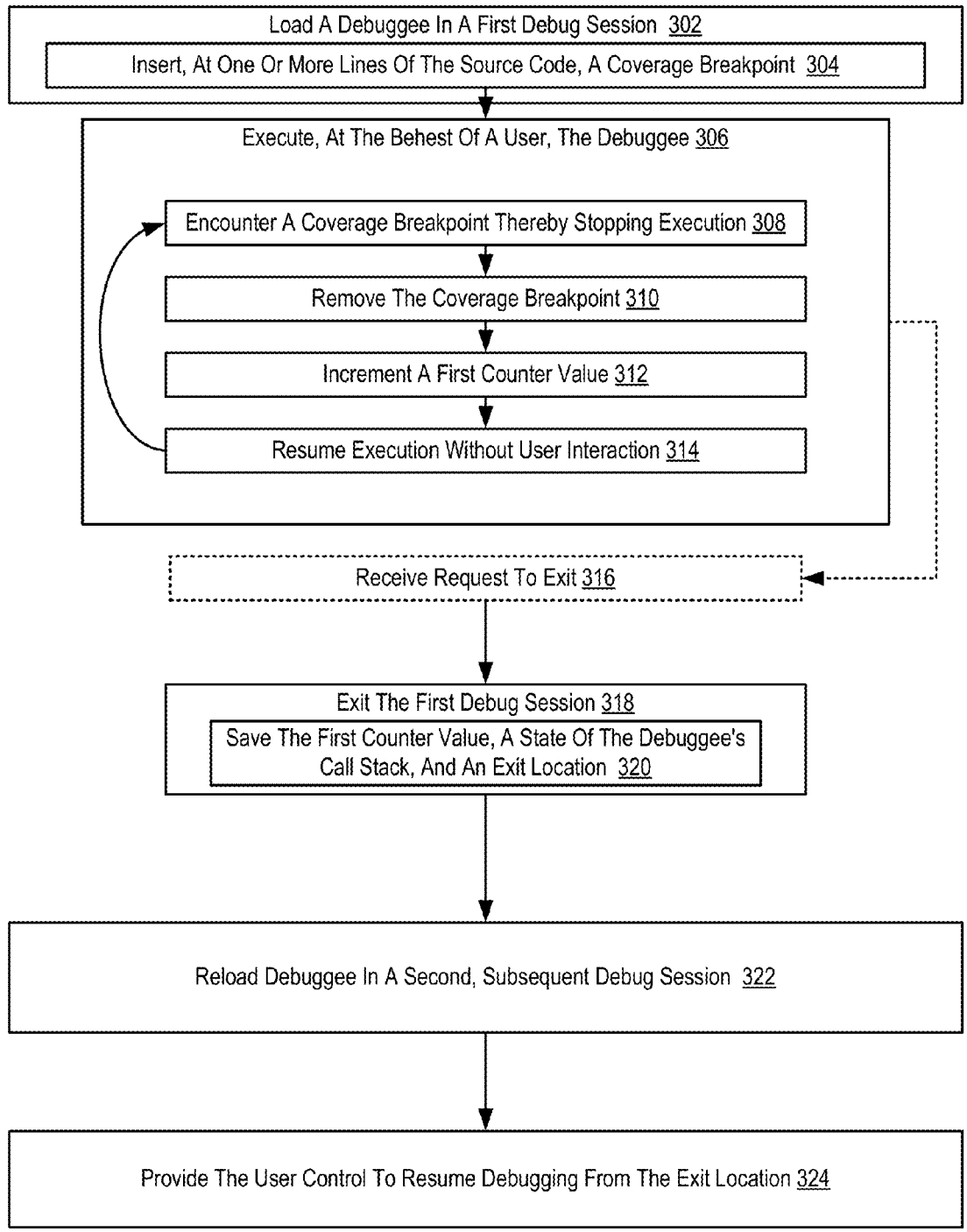
FIG. 3 sets forth a flow chart illustrating an exemplary method for resuming a prior debug session according to embodiments of the present invention.

For further explanation, FIG. 3 sets forth a flow chart illustrating an exemplary method for resuming a prior debug session according to embodiments of the present invention. The method of FIG. 3 includes loading (302) a debuggee in a first debug session. In the method of FIG. 3, loading (302) a debuggee in a first debug session includes inserting (304), at one or more lines of debuggee source code, a coverage breakpoint. Inserting (304), at one or more lines of debuggee source code, a coverage breakpoint may be carried out by replacing original machine-level instructions of debuggee with a predefined opcode or other predefined instruction that causes execution of the debuggee to halt, storing the original machine-level instructions and creating an entry in a breakpoint table representing the inserted breakpoint. The entry in the breakpoint table may include a location of the inserted breakpoint, an address for the saved original machine-level instructions, and a field specifying a type of the breakpoint—a 'coverage' breakpoint in this example.

In some embodiments, inserting (304) the coverage breakpoints includes inserting a coverage breakpoint at every line of the source code, while in other embodiments, inserting (304) the coverage breakpoints includes inserting a coverage breakpoint at every line of source code except lines within a routine, each routine having an entry point. When a coverage breakpoint at an entry point of a routine is encountered, the debugger, prior to resuming execution, may insert breakpoints at the lines within the routine.

The method of FIG. 3 also includes executing (306) the debuggee at the behest of a user. Such execution may include any typically debugging operations: step, step over, run, evaluating expressions, and so on as will occur to readers of skill in the art.

The method of FIG. 3 also includes encountering (308) a coverage breakpoint thereby stopping execution, removing (310) the coverage breakpoint, incrementing (312) a first counter value, and resuming (314) execution without user interaction. Removing (310) the coverage breakpoint may be carried out by replacing the predefined breakpoint opcode inserted at load time with the original instruction stored upon the breakpoint's insertion and removing the entry representing the breakpoint from the breakpoint table.

At any time during execution (306) of the debuggee, a user may initiate an exit of the first debug session. That is, the method of FIG. 3 includes receiving (316), asynchronously during execution (306) of the debuggee, a request to exit the first debug session.

The method of FIG. 3 continues by exiting (318) the first debug session. In the method of FIG. 3, exiting (318) the first debug session includes saving (320) the first counter value, a state of the debuggee's call stack, and an exit location. The counter value, call stack state, and exit location may be stored in a single or multiple data structures, with the debuggee source files for efficient access in later debug sessions. In some embodiments saving (320) the first counter value, a state of the debuggee's call stack, and an exit location may also include saving exit values of one or more user-selected expressions. A user may, for example, select one or more expressions or variables, the values of which will be saved on exit for later use in resuming the debug session. Such values are referred to as saved exit values of user-selected expressions. As described below in more detail with respect to FIG. 4, the saved exit values and the saved call stack state may be used to determine whether a second, subsequent debug session has executed to the same point at which the first debug session exited.

The method of FIG. 3 also includes reloading (322) the debuggee in a second, subsequent debug session and providing (324) the user control to resume debugging from the exit location only if the present state of the call stack matches the saved state of the call stack state. For ease of explanation, the steps of reloading (322) the debuggee in a second, subsequent debug session and providing (324) the user control to resume debugging from the exit location are described in greater detail with respect to FIG. 4.

Figure 4:
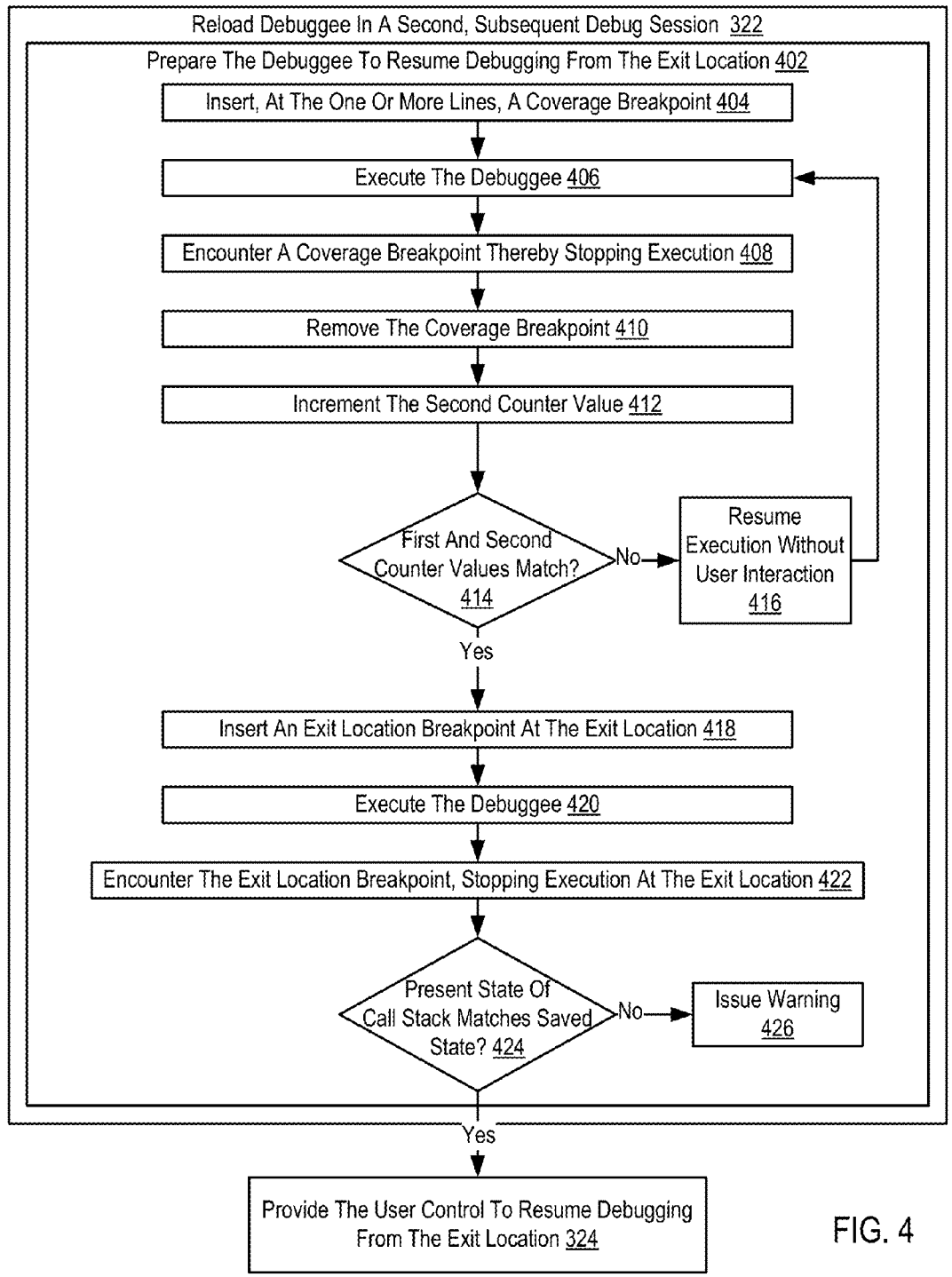
FIG. 4 sets forth a flow chart illustrating a further exemplary method for resuming a prior debug session according to embodiments of the present invention.

For further explanation, therefore, FIG. 4 sets forth a flow chart illustrating a further exemplary method for resuming a prior debug session according to embodiments of the present invention. More specifically, the method of FIG. 4 includes reloading (322) the debuggee in a second, subsequent debug session and providing (324) the user control to resume debugging from the exit location, each of which is a component of a larger method as depicted in the example of FIG. 3.

In the method of FIG. 4, reloading (322) the debuggee in a second, subsequent debug session includes preparing (402) the debuggee to resume debugging from the exit location. Preparing (402) the debuggee to resume debugging from the exit location includes inserting (404), at the one or more lines of the debuggee's source code, a coverage breakpoint and executing (406) the debuggee. Similar to inserting (304) the coverage breakpoints in the first debug session as described above with respect to FIG. 3, inserting (404) the coverage breakpoints in the second debug session may include inserting the coverage breakpoints at every line of debuggee source code or in other embodiments inserting a coverage breakpoint at every line of source code except lines within a routine, where each routine has an entry point.

Preparing (402) the debuggee to resume debugging from the exit location continues by encountering (408) a coverage breakpoint thereby stopping execution, removing (410) the coverage breakpoint, incrementing (412) a second counter value, and determining (414) whether the first and second counter values match. In embodiments in which coverage breakpoints are inserted (404) at every line of source code except lines within routines, encountering (408) a coverage breakpoint may include encounter a coverage breakpoint at an entry point to a routine and removing (410) the coverage breakpoint may include inserting a coverage breakpoint at each line of the routine.

If the first and second counter values do not match, the method continues by resuming (416) execution without user interaction. If the first and second counter values match, the method continues by inserting (418) an exit location breakpoint at the exit location, executing (420) the debuggee until encountering (422) the exit location breakpoint thereby stopping execution at the exit location, and determining (424) whether the present state of the call stack matches the saved state of the call stack state. If the present state of the call stack does not match the saved state, the method of FIG. 4 continues by issuing (426) a warning to the user that resuming the prior debug session was unsuccessful. If the present state of the call stack matches the saved state, the method of FIG. 4 continues by providing (324) the user control to resume debugging from the exit location. Providing (324) the user control to resume debugging from the exit location may include, among other things, notifying the user that debugging has been resumed from the exit location of the first debug session.

As mentioned above, in some embodiments, a user may specify one or more expressions or variables in the first debug session having values to be saved on exit for later use in resuming the debug session. Such values are referred to as saved exit values. In embodiments utilizing saved exit values, the method of FIG. 4 may include, in addition to determining (424) whether the present state of the call stack matches the saved state, determining whether the current values of the user-selected expressions match the saved exit values. Only if both (1) the present state of the call stack matches the saved state and (2) the current values of the user-selected expressions match the saved exit values, will the method of FIG. 4 continue to provide (324) the user control to resume debugging from the exit location.

Figure 5:
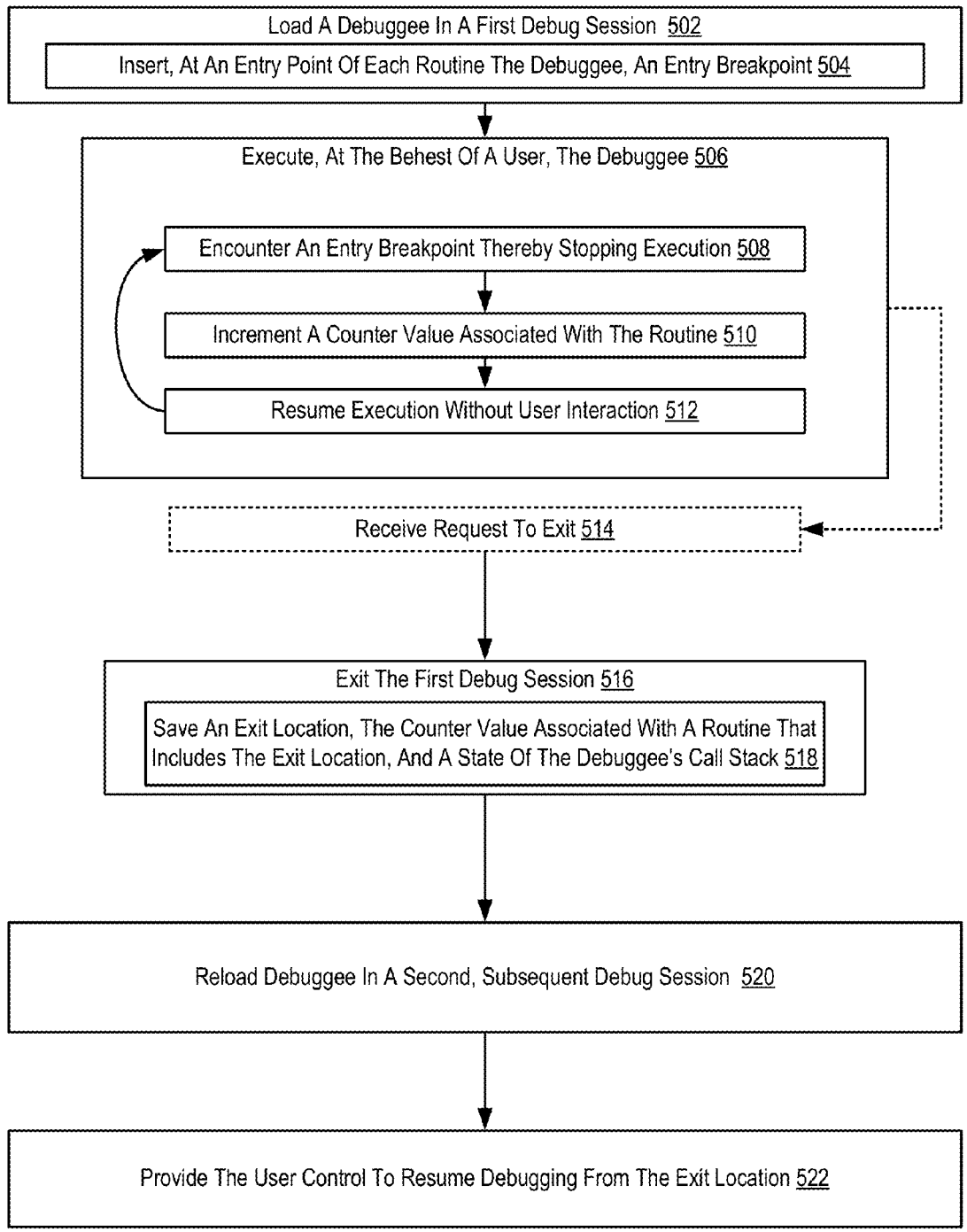
FIG. 5 sets forth a flow chart illustrating a further exemplary method for resuming a prior debug session according to embodiments of the present invention.

For further explanation, FIG. 5 sets forth a flow chart illustrating a further exemplary method for resuming a prior debug session according to embodiments of the present invention. The method of FIG. 5 includes loading (502) a debuggee in a first debug session. In the method of FIG. 5, loading (502) a debuggee in a first debug session includes inserting (504), at an entry point of each routine of the debuggee, an entry breakpoint. Inserting (504), at an entry point of each routine of the debuggee, an entry breakpoint may also include establishing, separately for each routine, a counter and initialization each counter to zero.

The method of FIG. 5 continues by executing (508), at the behest of a user, the debuggee. In the method of FIG. 5 executing (508) the debuggee includes encountering (508) an entry breakpoint thereby stopping execution, incrementing (510) a counter value associated with the routine, and resuming (512) execution without user interaction. At any time during execution (508), a user may request to exit the first debug session. That is, the method of FIG. 5 includes receiving (514), asynchronously during execution (506) of the debuggee, a request to exit the first debug sessions.

Responsive to the request, the method of FIG. 5 includes exiting (516) the first debug session. In the method of FIG. 5, exiting (516) the first debug session includes saving (518) an exit location, the counter value associated with a routine that includes the exit location, and a state of the debuggee's call stack. Saving (518) the exit location, the counter value, and the call stack state may also include saving exit values of one or more user-selected expressions.

The method of FIG. 5 continues by reloading (520) the debuggee in a second, subsequent debug session and providing (522) the user control to resume debugging from the exit location only if the present state of the call stack matches the saved state of the call stack state. For ease of explanation, the steps of reloading (520) and providing (522) are described below in greater detail with respect to FIG. 6.

Figure 6:
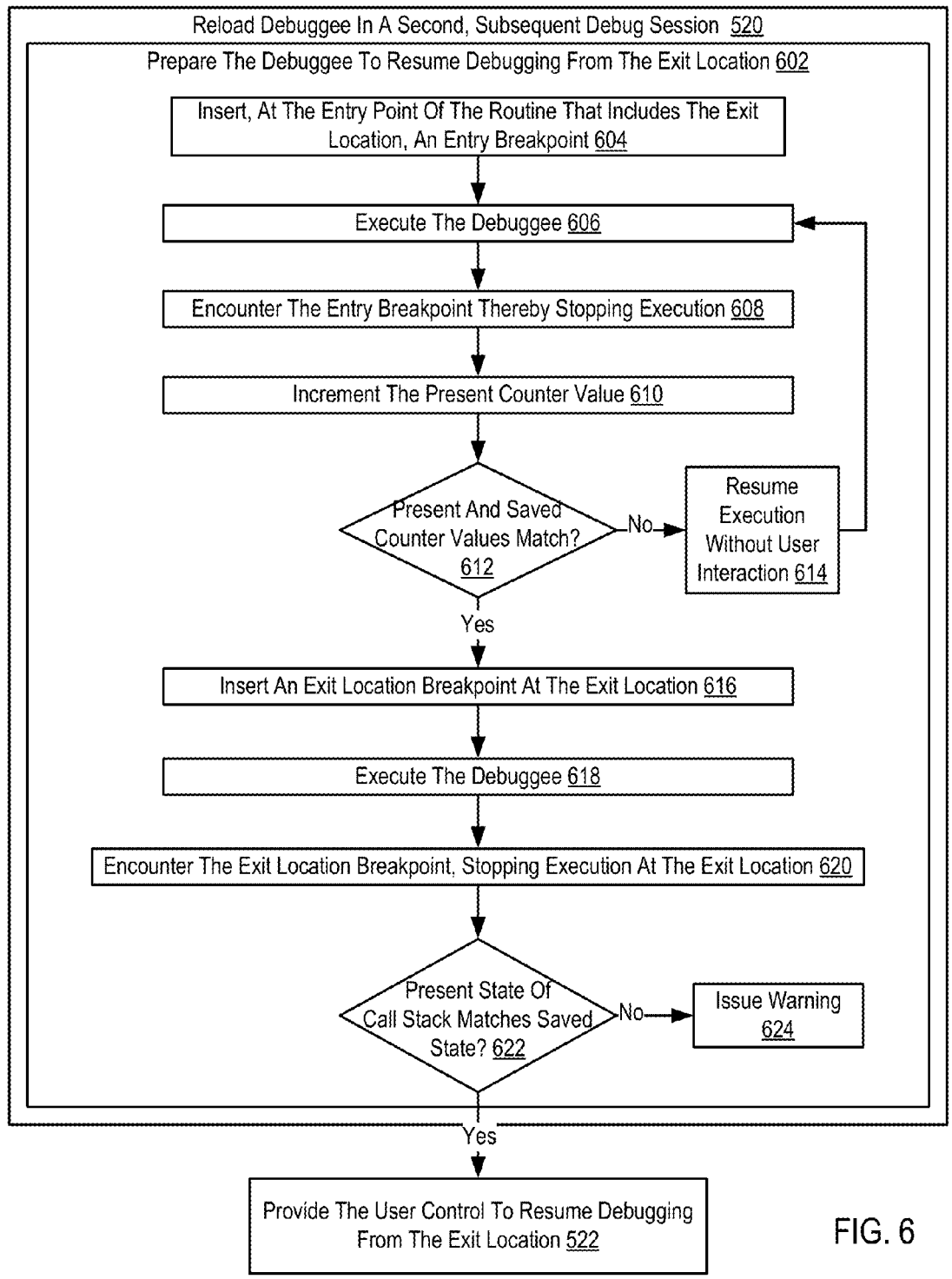
FIG. 6 sets forth a flow chart illustrating a further exemplary method for resuming a prior debug session according to embodiments of the present invention.

For further explanation, therefore, FIG. 6 sets forth a flow chart illustrating a further exemplary method for resuming a prior debug session according to embodiments of the present invention. The method of FIG. 6 includes the steps of reloading (520) the debuggee in a second, subsequent debug session and providing (522) the user control to resume debugging from the exit location only if the present state of the call stack matches the saved state of the call stack state depicted in the example of FIG. 5.

In the method of FIG. 6 reloading (520) the debuggee in a second, subsequent debug session includes inserting (604), at the entry point of the routine that includes the exit location, an entry breakpoint, executing (606) the debuggee, encountering (608) the entry breakpoint thereby stopping execution, incrementing (610) a present counter value, and determining (612) whether the present counter value matches the saved counter value. If the present counter value does not match the saved counter value, the method of FIG. 6 continues by resuming (614) execution without user interaction.

If the present counter value does match the saved counter value, the method of FIG. 6 continues by inserting (616) an exit location breakpoint at the exit location, executing (618) the debuggee until encountering (620) the exit location breakpoint thereby stopping execution at the exit location, and determining (622) whether the present state of the call stack matches the saved state of the call stack state. If the present state of the call stack does not match the saved state of the call stack state, the method of FIG. 6 continues by issuing (624) a warning to the user that the prior debug session could not be resumed from the exit location of the prior debug session. If the present state of the call stack matches the saved state of the call stack state, the method of FIG. 6 continues by providing (522) the user control to resume debugging from the exit location.

In embodiments in which saving (518) includes saving exit values of one or more user-selected expressions, the method of FIG. 6 may also include—in addition to determining (622) whether the current state of the call stack matches the saved state—determining whether the present values of the user-selected expressions in the second debug sessions match the saved exit values of the user-selected expressions in the first debug sessions. In such embodiments, the method of FIG. 6 may provide (522) the user control to resume debugging from the exit location only if: (1) the present state of the call stack matches the saved state and (2) the present values of the user-selected expressions in the second debug sessions match the saved exit values of the user-selected expressions in the first debug sessions. Such utilization of values of user-selected expressions, increases the probability and accuracy of an exact match between the first and second debug sessions in execution of the debuggee to the exit location.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable transmission medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable transmission medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable transmission medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for resuming a prior debug session, the apparatus comprising a computer processor, a computer memory operatively coupled to the computer processor, the computer memory having disposed within it computer program instructions that, when executed by the computer processor, cause the apparatus to carry out the steps of:

loading a debuggee in a first debug session including inserting, at one or more lines of debuggee source code, a coverage breakpoint, including inserting a coverage breakpoint at every line of the source code; executing, at the behest of a user, the debuggee including, for each coverage breakpoint encounter until exiting the first debug session: encountering a coverage breakpoint thereby stopping execution, removing the coverage breakpoint, incrementing a first counter value, and resuming execution without user interaction; exiting the first debug session including saving the first counter value, a state of the debuggee's call stack, and an exit location;

upon reloading the debuggee in a second, subsequent debug session, preparing the debuggee to resume debugging from the exit location, including: inserting, at the one or more lines of the debuggee's source code, a coverage breakpoint, including inserting a coverage breakpoint at every line of the source code; executing the debuggee; for each coverage breakpoint encounter until a second counter value matches the first counter value: encountering a coverage breakpoint thereby stopping execution, removing the coverage breakpoint, incrementing the second counter value, and resuming execution without user interaction; and when the first and second counter values match: inserting an exit location breakpoint at the exit location, executing the debuggee until encountering the exit location breakpoint thereby stopping execution at the exit location, and providing the user control to resume debugging from the exit location only if the present state of the call stack matches the saved state of the call stack state.

2. The apparatus of claim 1 wherein saving the first counter value, a state of the debuggee's call stack, and an exit location further comprises saving exit values of one or more user-selected expressions; and providing the user control to resume debugging from the exit location only if the present state of the call stack matches the saved state of the call stack state further comprises providing the user control to resume debugging from the exit location only if the present state of the call stack matches the saved state of the call stack state and the current values of the user-selected expressions match the saved exit values.

3. The apparatus of claim 1 wherein, in the first and second debug sessions:

inserting, at one or more lines of the source code, a coverage breakpoint further comprises inserting a coverage breakpoint at every line of source code except lines within a routine, each routine having an entry point; and
encountering a breakpoint further comprises encountering a coverage breakpoint at an entry point to a routine; and
removing the coverage breakpoint further comprises inserting a coverage breakpoint at each line of the routine.

4. A computer program product for resuming a prior debug session, the computer program product disposed upon a computer readable medium, wherein the computer readable medium is not a signal, the computer program product comprising computer program instructions that, when executed, cause a computer to carry out the steps of:

loading a debuggee in a first debug session including inserting, at one or more lines of debuggee source code, a coverage breakpoint, including inserting a coverage breakpoint at every line of the source code; executing, at the behest of a user, the debuggee including, for each coverage breakpoint encounter until exiting the first debug session: encountering a coverage breakpoint thereby stopping execution, removing the coverage breakpoint, incrementing a first counter value, and resuming execution without user interaction; exiting the first debug session including saving the first counter value, a state of the debuggee's call stack, and an exit location;

upon reloading the debuggee in a second, subsequent debug session, preparing the debuggee to resume debugging from the exit location, including: inserting, at the one or more lines of the debuggee's source code, a coverage breakpoint, including inserting a coverage breakpoint at every line of the source code; executing the debuggee; for each coverage breakpoint encounter until a second counter value matches the first counter value: encountering a coverage breakpoint thereby stopping execution, removing the coverage breakpoint, incrementing the second counter value, and resuming execution without user interaction; and when the first and second counter values match: inserting an exit location breakpoint at the exit location, executing the debuggee until encountering the exit location breakpoint thereby stopping execution at the exit location, and providing the user control to resume debugging from the exit location only if the present state of the call stack matches the saved state of the call stack state.

5. The computer program product of claim 4 wherein saving the first counter value, a state of the debuggee's call stack, and an exit location further comprises saving exit values of one or more user-selected expressions; and providing the user control to resume debugging from the exit location only if the present state of the call stack matches the saved state of the call stack state further comprises providing the user control to resume debugging from the exit location only if the present state of the call stack matches the saved state of the call stack state and the current values of the user-selected expressions match the saved exit values.

6. The computer program product of claim 4 wherein, in the first and second debug sessions:

inserting, at one or more lines of the source code, a coverage breakpoint further comprises inserting a coverage breakpoint at every line of source code except lines within a routine, each routine having an entry point; and
encountering a breakpoint further comprises encountering a coverage breakpoint at an entry point to a routine; and
removing the coverage breakpoint further comprises inserting a coverage breakpoint at each line of the routine.

7. The computer program product of claim 4 wherein the computer readable medium comprises a storage medium.

8. A method of resuming a prior debug session, the method comprising:
loading a debuggee in a first debug session including inserting a coverage breakpoint at every line of source code except lines within a routine, and further inserting at an entry point of each routine of the debuggee, an entry breakpoint; executing, at the behest of a user, the debuggee including, for each entry breakpoint encounter until exiting the first debug session: encountering an entry breakpoint thereby stopping execution, incrementing a counter value associated with the routine, and resuming execution without user interaction; exiting the first debug session including saving an exit location, the counter value associated with a routine that includes the exit location, and a state of the debuggee's call stack;
upon reloading the debuggee in a second, subsequent debug session, preparing the debuggee to resume debugging from the exit location, including: inserting, a coverage breakpoint at every line of source code except lines within a routine, and further inserting at the entry point of the routine that includes the exit location, an entry breakpoint; executing the debuggee; for each encounter of the entry breakpoint until a present counter value matches the saved counter value: encountering the entry breakpoint thereby stopping execution, incrementing the present counter value, and resuming execution without user interaction; and when the present counter value matches the saved counter value: inserting an exit location breakpoint at the exit location, executing the debuggee until encountering the exit location breakpoint thereby stopping execution at the exit location, and providing the user control to resume debugging from the exit location only if the present state of the call stack matches the saved state of the call stack state.

9. The method of claim 8 wherein:
saving an exit location, the counter value associated with a routine that includes the exit location, and a state of the debuggee's call stack further comprises saving exit values of one or more user-selected expressions; and
providing the user control to resume debugging from the exit location only if the present state of the call stack matches the saved state of the call stack state further comprises providing the user control to resume debugging from the exit location only if the present state of the call stack matches the saved state of the call stack state and the current values of the user-selected expressions match the saved exit values.

10. An apparatus for resuming a prior debug session, the apparatus comprising a computer processor, a computer memory operatively coupled to the computer processor, the computer memory having disposed within it computer program instructions that, when executed by the computer processor, cause the apparatus to carry out the steps of:
loading a debuggee in a first debug session including inserting a coverage breakpoint at every line of source code except lines within a routine, and further inserting at an entry point of each routine of the debuggee, an entry breakpoint; executing, at the behest of a user, the debuggee, including for each entry breakpoint encounter until exiting the first debug session: encountering an entry breakpoint thereby stopping execution, incrementing a counter value associated with the routine, and resuming execution without user interaction; exiting the first debug session including saving an exit location, the counter value associated with a routine that includes the exit location, and a state of the debuggee's call stack;
upon reloading the debuggee in a second, subsequent debug session, preparing the debuggee to resume debugging from the exit location, including: inserting a coverage breakpoint at every line of source code except lines within a routine, and further inserting at the entry point of the routine that includes the exit location, an entry breakpoint; executing the debuggee; for each encounter of the entry breakpoint until a present counter value matches the saved counter value: encountering the entry breakpoint thereby stopping execution, incrementing the present counter value, and resuming execution without user interaction; and when the present counter value matches the saved counter value: inserting an exit location breakpoint at the exit location, executing the debuggee until encountering the exit location breakpoint thereby stopping execution at the exit location, and providing the user control to resume debugging from the exit location only if the present state of the call stack matches the saved state of the call stack state.

11. The apparatus of claim 10 wherein:
saving an exit location, the counter value associated with a routine that includes the exit location, and a state of the debuggee's call stack further comprises saving exit values of one or more user-selected expressions; and
providing the user control to resume debugging from the exit location only if the present state of the call stack matches the saved state of the call stack state further comprises providing the user control to resume debugging from the exit location only if the present state of the call stack matches the saved state of the call stack state and the current values of the user-selected expressions match the saved exit values.

12. A computer program product for resuming a prior debug session, the computer program product disposed upon a computer readable medium, wherein the computer readable medium is not a signal, the computer program product comprising computer program instructions that, when executed, cause a computer to carry out the steps of:
loading a debuggee in a first debug session including inserting, a coverage breakpoint at every line of source code except lines within a routine, and further inserting at an entry point of each routine of the debuggee, an entry breakpoint; executing, at the behest of a user, the debuggee, including for each entry breakpoint encounter until exiting the first debug session: encountering an entry breakpoint thereby stopping execution, incrementing a counter value associated with the routine, and resuming execution without user interaction; exiting the first debug session including saving an exit location, the counter value associated with a routine that includes the exit location, and a state of the debuggee's call stack;
upon reloading the debuggee in a second, subsequent debug session, preparing the debuggee to resume debugging from the exit location, including: inserting a coverage breakpoint at every line of source code except lines within a routine, and further inserting at the entry point of the routine that includes the exit location, an entry breakpoint; executing the debuggee; for each encounter of the entry breakpoint until a present counter value matches the saved counter value: encountering the entry breakpoint thereby stopping execution, incrementing the present counter value, and resuming execution without user interaction; and when the present counter value matches the saved counter value: inserting an exit location breakpoint at the exit location, executing the debuggee until encountering the exit location breakpoint thereby stopping execution at the exit location, and providing the user control to resume debugging from the exit location only if the present state of the call stack matches the saved state of the call stack state.

13. The computer program product of claim 12 wherein:

saving an exit location, the counter value associated with a routine that includes the exit location, and a state of the debuggee's call stack further comprises saving exit values of one or more user-selected expressions; and providing the user control to resume debugging from the exit location only if the present state of the call stack matches the saved state of the call stack state further comprises providing the user control to resume debugging from the exit location only if the present state of the call stack matches the saved state of the call stack state and the current values of the user-selected expressions match the saved exit values.

* * * * *